United States Patent
Bousset et al.

(10) Patent No.: US 9,707,936 B2
(45) Date of Patent: Jul. 18, 2017

(54) WIPER SYSTEM FOR SPRAYING A CLEANING AND/OR DEICING FLUID FROM THE REGION OF A WINDSCREEN WIPER

(71) Applicant: Valeo Systèmes d'Essuyage, Le Mesnil Saint Denis (FR)

(72) Inventors: Xavier Bousset, Mezel (FR); Denis Thebault, Clermont Ferrand (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 156 days.

(21) Appl. No.: 14/302,191

(22) Filed: Jun. 11, 2014

(65) Prior Publication Data
US 2014/0366301 A1 Dec. 18, 2014

(30) Foreign Application Priority Data

Jun. 14, 2013 (FR) ...................... 13 55555

(51) Int. Cl.
| B60S 1/52 | (2006.01) |
| B60S 1/38 | (2006.01) |
| B60S 1/32 | (2006.01) |
| B60S 1/34 | (2006.01) |

(52) U.S. Cl.
CPC ............. B60S 1/522 (2013.01); B60S 1/32 (2013.01); B60S 1/3862 (2013.01); B60S 1/524 (2013.01); B60S 1/3415 (2013.01)

(58) Field of Classification Search
CPC ........ B60S 1/3862; B60S 1/522; B60S 1/524; B60S 1/3415; F16L 3/13
USPC ....................................... 15/250.04
See application file for complete search history.

(56) References Cited

U.S. PATENT DOCUMENTS

| 3,757,379 A * | 9/1973 | Benson .................. B60S 1/524 15/250.04 |
| 3,969,783 A * | 7/1976 | Shipman ................ B60S 1/524 15/250.04 |
| 2013/0111689 A1* | 5/2013 | Picot ..................... B60S 1/524 15/250.04 |

FOREIGN PATENT DOCUMENTS

| DE | 102011054066 A1 * | 4/2013 | ............. B60S 1/522 |
| WO | WO 2009132982 A1 * | 11/2009 | ........... B60S 1/3862 |
| WO | 2010/006775 A1 | 1/2010 | |

OTHER PUBLICATIONS

WO2009132982 (machine translation), 2015.*
DE102011054066 (machine translation), 2015.*

* cited by examiner

*Primary Examiner* — Andrew A Horton
(74) *Attorney, Agent, or Firm* — Osha Liang LLP

(57) ABSTRACT

The invention relates to a wiper system (1) comprising:
 a driving arm (3) comprising a rod (30) extended by an end portion (31) that is able to be connected to a windscreen wiper (2);
 a windscreen wiper (2) fitted on said end portion (31) and comprising at least one ramp (10) that is able to channel a cleaning and/or deicing fluid;
characterized in that said wiper system (1) comprises:
 a transporting pipe (5) for said fluid, which passes at least in part along said rod (30), said pipe (5) helping to channel said fluid towards said ramp (10);
 a connecting means (8) that helps to provide a removable connection between said pipe (5) and said ramp (10) and helping to channel said fluid from said pipe (5) towards said ramp (10);
 a retaining means (9) that is able to ensure fastening of said connecting means (8) to said rod (30).

15 Claims, 2 Drawing Sheets

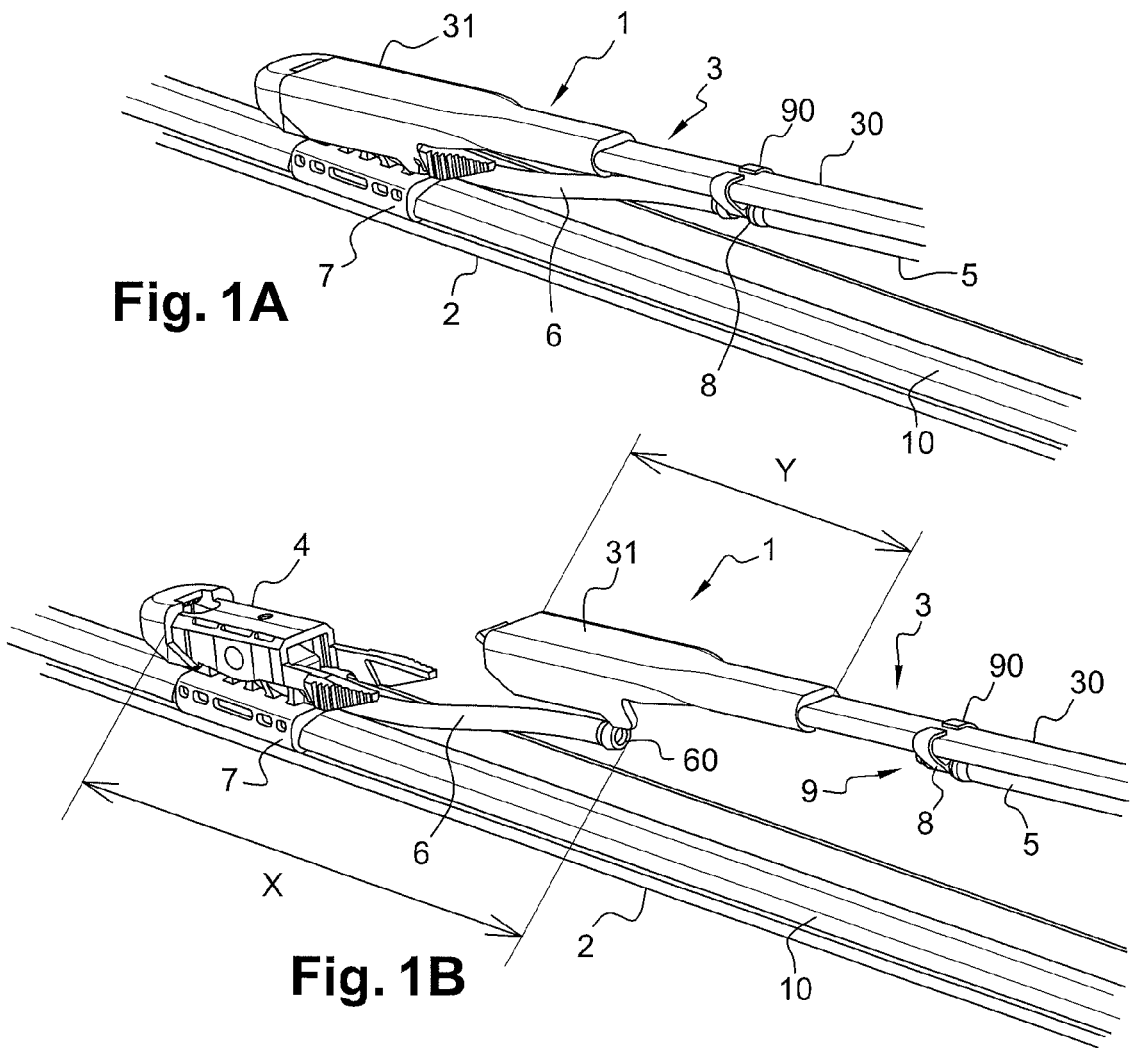
Fig. 1A
Fig. 1B
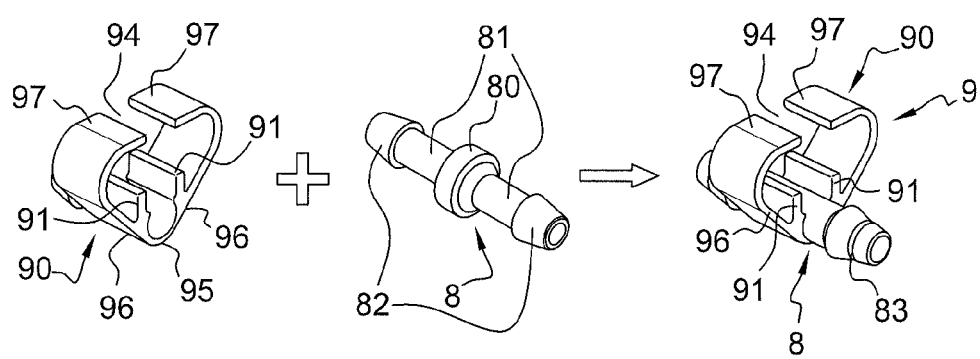
Fig. 2

WIPER SYSTEM FOR SPRAYING A CLEANING AND/OR DEICING FLUID FROM THE REGION OF A WINDSCREEN WIPER

The subject of the present invention is a wiper system for spraying a cleaning and/or deicing fluid from the region of at least one windscreen wiper.

It is intended in particular, but not exclusively, to be installed on motor vehicles.

It is known that wiper systems for directly ejecting the cleaning and/or deicing fluid from the region of a windscreen wiper generally have at least one windscreen wiper which comprises at least one ramp for feeding said fluid; at least one driving arm shaped so as to be able to drive the windscreen wiper over a glazed surface such as a window or windscreen, which is connected by means of a supply device to a source of cleaning and/or deicing fluid; connecting means for connecting the supply device to the ramp for feeding the cleaning and/or deicing fluid.

A wiper system of this type is described for example in the international patent application published under the number WO 2010/006775. This wiper system has a windscreen wiper articulated on an actuating arm by way of an adapter connected on one side to said arm and on the other side to a hydraulic connector which is itself connected to said wiper. This wiper system also comprises an intake line for cleaning and/or deicing fluid, which is connected to an inlet coupling of the hydraulic connector by means of a rigid joining element. In order to keep the rigid joining element in position, the arm may have blocking means which comprise a cutout formed either in one of the walls of the adapter or of the arm or in a component attached to said adapter, these blocking means having a shape that allows the rigid joining element to be able to be forcibly wedged temporarily into this cutout.

However, it has been found that the connection between the fluid intake line and the wiper is made in the region of the adapter or in the region of the end portion of the arm which has the approximate shape of a clevis, this not allowing completely free access to the connection, the arm having to be pivoted or removed with respect to the wiper when it is desirable to connect or disconnect the intake line to or from the arm.

In addition, the production of a specific cutout of the abovementioned type is restrictive industrially since it generates additional costs, while the use of an attached component requires the production of a specific vertical-axis component which is only suitable for a single form of driving arm.

Furthermore, the rigid joining element is inserted or forcibly wedged in the cutout or in the attached component by moving it in translation. However, it has been found that the rigid joining element is not blocked in all directions, it being possible for the latter to be ejected from its housing in the direction opposite to that of the movement in translation.

The object of the present invention is in particular to remedy these major drawbacks by proposing a wiper system for spraying a cleaning and/or deicing fluid from the region of at least one windscreen wiper, this making it possible to easily connect the fluid intake pipe to the driving arm without it being necessary to move or remove the arm with respect to the wiper.

Furthermore, according to variant embodiments of the invention, the wiper system makes it possible to connect the fluid intake pipe to the driving arm in such a manner that:
 the rotation of the wiper with respect to the arm is not impeded;
 the intake pipe is blocked in all directions;
 the fluid intake pipe may be connected to driving arms having various shapes and dimensions.

To this end, the invention proposes a wiper system comprising:
 a driving arm comprising a rod extended by an end portion that is able to be connected to a windscreen wiper;
 a windscreen wiper fitted on said end portion and comprising at least one ramp that is able to channel a cleaning and/or deicing fluid;
said wiper system comprising:
 a transporting pipe for said fluid, which passes at least in part along said rod, said pipe helping to channel said fluid towards said ramp;
 a connecting means that helps to provide a removable connection between said pipe and said ramp and helps to channel said fluid from said pipe towards said ramp;
 a retaining means that is able to ensure fastening of said connecting means to said rod.

Such a retaining means may be produced for example in the form of one or more components attached to the rod, in particular by being crimped, adhesively bonded, overmoulded or welded on or to the rod, such as by ultrasonic welding, but may also be produced in one piece with the rod. The retaining means may thus be rendered either removable or non-removable from the rod.

In this way, the wiper system makes it possible both:
 to connect the fluid transporting pipe to the ramp; and also
 to connect the means for connecting to the rod, away from said end portion, this advantageously making it possible to carry out these connections without having to pivot or remove the arm with respect to the wiper.

Furthermore, the retaining means advantageously makes it possible to connect and disconnect said transporting pipe to and from the driving arm without it being necessary to produce a specific cutout in the driving arm, said cutout being intended to engage with a specific shape of a specific coupling component.

Advantageously, the wiper system according to the invention is such that it also comprises:
 a connection device for fitting the windscreen wiper in an articulated manner on said driving arm in the region of said end portion.

More preferably, the wiper system according to the invention is such that said connection device comprises a connector fastened to said wiper, said wiper system comprising an inlet pipe for admitting said fluid into said connector, said inlet pipe being able to channel said fluid from said connecting means towards said connector.

Even more preferably, the wiper system according to the invention is such that said fastening of said connecting means to said rod is removable.

Advantageously, said end portion has an upper face the length of which is less than the distance between, on one side, a wall of the adapter which is approximately perpendicular to said upper face and against which wall of the adapter said end portion is in contact when the latter is fitted on the windscreen wiper, and, on the other side, a free end of the inlet pipe to which the connecting means is connected. In this way, the connection point between the transporting pipe and the fluid inlet pipe is moved away from the connection device, and the fitting and removal operations are thus made easier.

According to one variant embodiment of the invention, the retaining means has:

a linking means that is able to engage with said rod in order to ensure fastening, known as first fastening, of said retaining means to said driving arm; and a fastening means that is able to ensure fastening, known as second fastening, of said connecting means to said retaining means, said fastening means comprising a portion which extends, in the use position, substantially opposite a portion of the rod to which said linking means is connected.

Advantageously, the wiper system according to the invention is such that said fastening means is able to ensure removable fastening of said connecting means to said retaining means. In other words, said second fastening is removable.

According to another variant embodiment of the invention, said fastening means is able to ensure said second removable fastening by snap-fastening of said connecting means to said retaining means.

According to one variant embodiment of the invention, said fastening means is able to block the connecting means in all directions.

In this way, the transporting pipe is blocked in all directions.

According to another variant embodiment of the invention, said retaining means is shaped so as to define an internal space comprising:

a first housing that is able to receive a portion of the rod;

a second housing that forms said fastening means.

Preferably, the first housing and the second housing are disposed with respect to one another such that when the retaining means is in a position connected to the rod, a portion of the rod helps to keep said connecting means in the second housing.

Thus, the wiper system makes it possible for the connecting means to be blocked in all directions.

According to one variant embodiment of the invention, said linking means comprises walls that delimit a slot at which the first housing opens out, said slot being able to allow the introduction of a portion of the rod into said retaining means.

According to another variant embodiment of the invention, the linking means has a base which is successively extended at each of its ends by a wall comprising:

a first part that extends transversely with respect to said base;

a second, turned-back part;

said two second parts delimiting said slot, said linking means being symmetrical with respect to the median transverse axis of said base.

According to another variant embodiment of the invention, the fastening means has two projections that extend from said base into the internal space of the retaining means, the gap between two projections making it possible to dispose said connecting means in this gap.

According to another variant embodiment of the invention, the retaining means is produced from a material or group of materials that allow(s) it to deform elastically.

The elastic deformation capability of the retaining means advantageously allows the retaining means to be able to be connected to and disconnected from driving arms having different dimensions, it being possible for example for the slot to widen when the driving arm is introduced and then retract when the rod of this driving arm is entirely within said first housing. Furthermore, the elasticity of the linking means makes it possible to clamp a portion of the rod of the driving arm without causing shearing.

Preferably, the retaining means is produced by moulding.

According to one variant embodiment of the invention, the retaining means is able to move in translation with respect to a portion of the rod when it is connected to the rod.

According to another variant, the wiper system according to the invention is such that it comprises a means for blocking the retaining means in position on the rod in at least one longitudinal direction of extension of said rod. Preferably, the abovementioned blocking means is such that it prevents any movement of the retaining means with respect to said rod.

This means for blocking the retaining means in position on the rod is produced for example by a form and a counter-form that are located on the retaining means and on the rod, respectively.

Further features and advantages of the present invention will become apparent from the following examples and the appended figures, said examples and figures being given only by way of nonlimiting example.

FIG. 1A is a schematic illustration of a wiper system according to the invention which has a windscreen wiper articulated on an actuating arm, showing the retaining means in particular for connecting the fluid transporting pipe to said arm.

FIG. 1B is a schematic illustration of the wiper system according to the invention shown in FIG. 1A, in which the arm and the wiper are in a removed position.

FIG. 2 is a schematic illustration of the retaining means and of the connecting means that are shown in FIGS. 1A and 1B, in the fitted position and in the removed position.

Figure 3A:
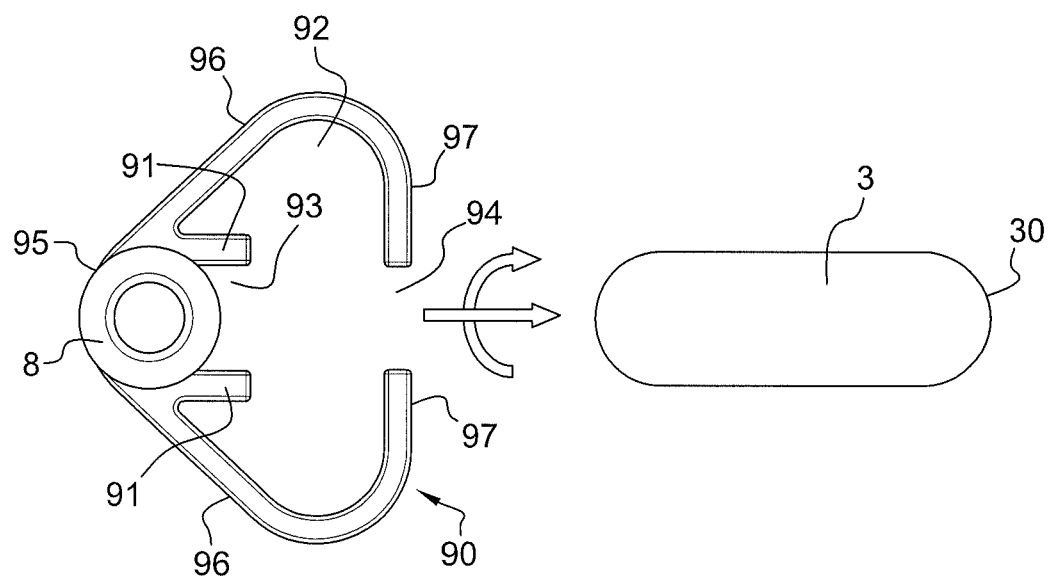
FIG. 3A is a schematic illustration, in cross section, of the connecting means and of the retaining means that are shown in FIG. 2, showing the movements which need to be carried out for fitting to the arm.

For reasons of clarity, only the elements that are essential for understanding the invention have been shown schematically, without respecting scale.

As shown in FIGS. 1A and 1B, the wiper system 1 according to the invention has:

a windscreen wiper 2 having at least one ramp 10 for feeding and dispensing a cleaning and/or deicing fluid;

a driving arm 3 that is able to drive the windscreen wiper 2 over a glazed surface, the driving arm 3 comprising a rod 30 that is extended by an end portion 31 that is able to be connected to the wiper 2;

an adapter 4 for fitting the windscreen wiper 2 in an articulated manner on said driving arm 3 in the region of said end portion 31;

a transporting pipe 5 for the flow of a fluid, able to be connected to a source (not shown) of cleaning and/or deicing fluid, this pipe 5 being in this case in the form of an intake pipe.

Said ramp 10 comprises at least one pressurized spray orifice (not shown) which makes it possible to dispense said fluid onto the glazed surface, preferably by spraying. Preferably, said spray orifices open onto at least one of the longitudinal and lateral edges of the windscreen wiper 2.

In this example, said ramp 10 is connected at one of its ends, directly or indirectly, to an inlet pipe 6 which in this case has an approximately tubular shape so as to form a cannula. This inlet pipe 6 extends on the side opposite the side where the wiper blade of the wiper 2 is located, in the space between the driving arm 3 and the windscreen wiper 2, when the driving arm 3 and the wiper 2 are fitted together.

The inlet pipe 6 is preferably produced from a material which gives it flexibility properties, such as a plastics material, so as to make manipulations on the part of the user easier when the latter changes the windscreen wiper 2, for example.

The feeding and dispensing ramp 10 is generally connected indirectly to said inlet pipe 6 by way of a connector 7 which comprises at least one outlet coupling and an inlet coupling (these not being shown) that are able to allow the connection to the ramp 10 and to the inlet pipe 6, respectively.

Advantageously, said end portion 31 has an upper face the length Y of which is less than the distance X between, on one side, a wall of the adapter 4 which is approximately perpendicular to said upper face and against which wall of the adapter said end portion 31 is in contact when the latter is fitted on the windscreen wiper 2, and, on the other side, a free end of the inlet pipe 6 to which the connecting means 8 is connected. In this way, the connection point between the transporting pipe 5 and the fluid inlet pipe 6 is moved away from the connection device 4, 7, and the fitting and removal operations are thus made easier.

The wiper system 1 according to the invention also comprises a connecting means 8 that is able to directly or indirectly connect said transporting pipe 5 to said ramp 10.

In the example shown in FIGS. 1A and 1B, this connection is produced indirectly, the connecting means 8 being connected to the ramp 10 by way of the inlet pipe 6 and the connector 7.

As shown in particular in FIG. 2, said connecting means 8 has an approximately tubular shape, and has two ends 82 that are shaped so as to be able to cooperate respectively with the ends of the inlet pipe 6 and the intake pipe 5 which, in this example, forms the transporting pipe 5. The ends 82 of the connecting means 8 and the free ends of the inlet pipe 6 and of the intake pipe 5 are thus able to allow removable fastening between these components 5, 6, 8. By way of example, as shown in particular in FIG. 2, the ends of the connecting means 8 may comprise a thread 83 that is able to engage with tapped orifices 60 located at the ends of the intake pipe 5 and inlet pipe 6.

According to one variant embodiment of the invention, each of the ends 82 of this connecting means 8 may be approximately in the form of a conical frustum, oriented such that the small bases are directly opposite the ends of the intake pipe 5 and inlet pipe 6 during connection. The ends 82 of the connecting means 8 have dimensions which allow them to be partially introduced into said ends of the intake pipe 5 and inlet pipe 6.

Preferably, said connecting means 8 is rigid and has a nonreturn valve (not shown) for avoiding the reflow of cleaning and/or deicing fluid back towards said source of the fluid.

A retaining means 9 is able to ensure removable fastening of the connecting means 8 to a portion of the rod 30, away from said end portion 31.

According to one variant embodiment of the invention, the retaining means 9 has a connecting means 90 that is able to engage with said portion of rod 30 so as to ensure removable fastening, known as first fastening, of said retaining means 9 to said driving arm 3, and also a fastening means 91 that is able to ensure removable fastening, known as second fastening, of the connecting means 8 to the retaining means 9.

Preferably, the fastening means 91 is disposed so as to allow that portion of said connecting means 8 that engages with the fastening means 91 to extend, in the use position, approximately opposite the rod 30 to which the linking means 90 is connected.

Figure 3B:
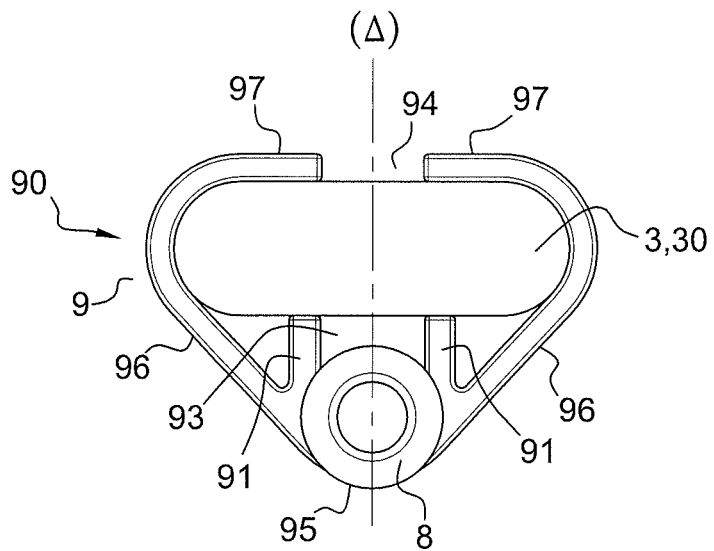
FIG. 3B is a schematic illustration, in cross section, of the connecting means and of the linking means that are shown in FIG. 2, in the position fitted on the arm.

As shown in FIGS. 2 to 3B, in this example the retaining means 9 is shaped so as to define an internal space comprising:

a first housing 92 that is able to receive a portion of the rod 30;

a second housing 93 that forms said fastening means 91.

Preferably, the first housing 92 and the second housing 93 are disposed with respect to one another such that, when the retaining means 9 is in a position connected to the portion of the rod 30, said portion of the rod 30 helps to keep the connecting means 8 in the second housing 93, preventing the expulsion of the connecting means 8 from this second housing 93 in at least one direction.

As shown in particular in FIG. 3B, said linking means 90 is in this case approximately in the form of a clip. The linking means 90 comprises walls that delimit a slot 94 at which the first housing 93 opens out, said slot 94 being able to allow the introduction of a portion of the rod 30. The linking means 90 has a base 95 which is successively extended at each of its ends by a wall comprising:

a first part 96 that extends transversely with respect to said base 95;

a second, turned-back part 97;

the gap between the two second parts 97 delimiting said slot 94, the linking means 90 being symmetrical with respect to the median transverse axis ($\Delta$) of said base 95. Said second parts 97 delimit the first housing 92.

In addition, the retaining means 9 is preferably produced from a material or a group of materials that allow it to deform in a non-permanent manner. Thus, by way of example, the retaining means 9 may be produced from a polymer material having a yield strength that makes it possible to satisfy this constraint, the choice of this polymer material falling within the general skills of a person skilled in the art. In this way, the elastic deformation capability of the retaining means 9 advantageously allows it to be connected to and disconnected from driving arms 3 having different dimensions. The parts of the linking means 90 that are in contact with the driving arm 3 may thus be deformed and modify the dimensions in particular of the first housing 92 and of said slot 94, thereby making it easier to introduce the driving arm 3 into these spaces. Moreover, these elastic deformation properties can allow the linking means 90 to grip a substantial part of that portion of the rod 30 of the driving arm 3 with which the retaining means 9 is in contact after connection, thereby advantageously optimizing the hold of the retaining means 9.

Preferably, said fastening means 91 is able to ensure the second removable fastening by snap-fastening of the connecting means 8 to the retaining means 9.

Preferably, the fastening means 91 matches the shape of the connecting means 8 in order to allow this connection by snap-fastening.

Thus, in this case, as shown in particular in FIGS. 3A and 3B, the fastening means 91 has two longitudinal-axis projections that extend from said base 95 into the internal space of the retaining means 9, the gap between the two projections 91 making it possible to dispose the connecting means 8 therein. These two projections 91 preferably extend on either side of said axis of symmetry ($\Delta$).

Preferably, the projections 91 are made of a material or a group of materials that allow them to deform non-permanently, thereby making the connection by snap-fastening between the connecting means 8 and the projections 91 easier.

Advantageously, as shown in particular in FIG. 3B, the projections 91 preferably have a height that allows the driving arm 3 to bear against one of the sides thereof after it has been introduced into the first housing 92, thereby advantageously making it possible to hold the connecting means 8 in said gap and to block it in all directions.

According to one variant embodiment of the invention, and as shown in FIG. 2, the connecting means 8 may have a collar 80 which has two opposite faces from each of which a duct 81 terminated by an end 82 having a thread 83 extends. In this case, the gap between two projections 91 is approximately equal to the diameter of the connecting means 8 in the region of said collar 80 in order to allow the connection by snap-fastening.

According to one variant embodiment of the invention, the retaining means 9 is able to move in translation with respect to the portion of the rod 30 when it is connected to the latter, this movement in translation being made possible by virtue of the dimensions of the first housing 92 and/or of the elastic properties of the retaining means 9.

The transporting pipe 5 is connected to the driving arm 3 by:
- snap-fastening the connecting means 8 to the retaining means 9;
- positioning the retaining means 9 such that said slot 94 is aligned with that edge of the rod 30 of the driving arm 3 that has the smallest dimensions;
- moving the retaining means 9 in translation so as to introduce the portion of the rod 30 of the driving arm 3 into said first housing 92 by way of said slot 94;
- rotating the retaining means 9 such that all of the portion of the rod 30 of the driving arm 3 with which the retaining means 9 is directly in contact after connection is introduced into the first housing 92; in the example shown in FIGS. 1 to 3B, the retaining means 9 is rotated through an angle approximately equal to 90°.

The transporting pipe 5 is disconnected from the driving arm 3 by carrying out these steps in reverse order.

It should be noted that variant forms of embodiment are of course possible and that the present invention is not limited to the example described in detail hereinabove. In particular, it is possible to extend the present invention to a wiper system in which said connecting means 8 is formed directly on said inlet pipe 6.

The invention claimed is:

1. A wiper system comprising:
   a driving arm comprising a rod extended by an end portion that is able to be connected to a windscreen wiper;
   a windscreen wiper fitted on said end portion and comprising at least one ramp that is able to channel a cleaning and/or de-icing fluid;
   a transporting pipe for said fluid, which passes at least in part along said rod, said pipe helping to channel said fluid towards said ramp;
   a joint that helps to provide a removable connection between said pipe and said ramp and to channel said fluid from said pipe towards said ramp;
   a first fastener that is able to ensure fastening of said joint to said rod,
   wherein the first fastener comprises a clip that is able to engage with said rod in order to ensure fastening, known as first fastening, of said first fastener to said driving arm,
   wherein said first fastener is shaped so as to define an internal space comprising:
     a first housing that is able to receive a portion of the rod; and
     a second housing that forms a second fastener, and
   wherein said clip comprises walls that delimit a slot at which the first housing opens out, the slot being able to allow the introduction of the portion of the rod into said first fastener; and
   said second fastener that fastens the joint to said first fastener,
     wherein said second fastener comprises two projections that extend from a base into the internal space of the first fastener, and
     wherein said second fastener comprises a portion that extends, in a use position, substantially opposite the portion of the rod to which said clip is connected.

2. The wiper system according to claim 1, also comprising:
   a connection device for fitting the windscreen wiper in an articulated manner on said driving arm in a region of said end portion.

3. The wiper system according to claim 2, wherein said connection device comprises a connector fixed to said wiper, said wiper system comprising an inlet pipe for admitting said fluid into said connector, said inlet pipe being able to channel said fluid from said joint towards said connector.

4. The wiper system according to claim 1, wherein said fastening of said joint to said rod is removable.

5. The wiper system according to claim 1, wherein said second fastener is able to ensure removable fastening of said joint to said first fastener.

6. The wiper system according to claim 5, wherein said second fastener is able to ensure said second removable fastening by snap-fastening of said joint to said first fastener.

7. The wiper system according to claim 1, wherein said second fastener is able to block the joint in all directions.

8. The wiper system according to claim 1, wherein the first housing and the second housing are disposed with respect to one another such that when the first fastener is in a position connected to the rod, the portion of the rod helps to keep said joint in the second housing.

9. The wiper system according to claim 1, wherein said clip has the base which is successively extended at each of its ends by the walls of the first fastener comprising:
   a first part that extends transversely with respect to said base; and
   two second, turned-back, parts delimiting said slot, said clip being symmetrical with respect to a median transverse axis of said base.

10. The wiper system according to claim 9, wherein the joint is disposed in a gap between the two projections of the second fastener.

11. The wiper system according to claim 1, wherein said first fastener is produced from a material or group of materials that allow(s) the first fastener to deform elastically.

12. The wiper system according to claim 1, wherein said first fastener is produced by moulding.

13. The wiper system according to claim 1, wherein said first fastener is able to move in translation with respect to the portion of the rod when the first fastener is connected to the rod.

14. The wiper system according to claim 1, further comprising a cutout that blocks the first fastener in position on the rod in at least one longitudinal direction of extension of said rod.

15. A wiper system comprising:
a driving arm comprising a rod extended by an end portion that is able to be connected to a windscreen wiper;
a windscreen wiper fitted on said end portion and comprising at least one ramp that is able to channel a cleaning and/or de-icing fluid;
a transporting pipe for said fluid, which passes at least in part along said rod, said pipe helping to channel said fluid towards said ramp;
a joint that helps to provide a removable connection between said pipe and said ramp and to channel said fluid from said pipe towards said ramp;
a first fastener that is able to ensure fastening of said joint to said rod, the first fastener comprising:
 a clip that is able to engage with said rod in order to ensure fastening, known as first fastening, of said first fastener to said driving arm; and
a second fastener that fastens the joint to said first fastener, wherein said second fastener comprises:
 two projections that extend from a base into an internal space of the first fastener, and
 a portion which extends, in a use position, substantially opposite a portion of the rod to which said clip is connected, and
wherein said first fastener is shaped so as to define the internal space comprising:
 a first housing that is able to receive the portion of the rod; and
 a second housing that forms said second fastener.

* * * * *